(12) United States Patent
Nicholls

(10) Patent No.: US 8,474,767 B1
(45) Date of Patent: Jul. 2, 2013

(54) BIKE TIE DOWN BAR

(75) Inventor: John Nicholls, Meadow Vista, CA (US)

(73) Assignee: Bike Tite, Inc., Reno, NV (US)

( * ) Notice: Subject to any disclaimer, the term of this patent is extended or adjusted under 35 U.S.C. 154(b) by 0 days.

(21) Appl. No.: 12/975,437

(22) Filed: Dec. 22, 2010

(51) Int. Cl.
- *E04G 25/00* (2006.01)
- *B65D 63/00* (2006.01)
- *A47H 1/10* (2006.01)
- *A47B 97/00* (2006.01)
- *B60P 3/00* (2006.01)
- *B60P 3/377* (2006.01)

(52) U.S. Cl.
USPC ........ 248/200.1; 248/499; 248/326; 248/333; 248/503; 296/3; 296/167

(58) Field of Classification Search
USPC .................. 248/200.1, 499, 326, 333, 188.5, 248/503, 505; 296/3, 40, 167; 410/101; 224/405, 323, 545, 550, 551, 570, 924, 403; 211/24, 17–23; 280/762, 769
See application file for complete search history.

(56) References Cited

U.S. PATENT DOCUMENTS

| | | | | |
|---|---|---|---|---|
| 1,321,742 A | * | 11/1919 | Hendricks | 411/368 |
| 3,366,256 A | * | 1/1968 | Meredith et al. | 414/462 |
| 5,127,564 A | * | 7/1992 | Romero | 224/403 |
| 5,261,719 A | * | 11/1993 | Tucker | 296/100.18 |
| 5,820,119 A | * | 10/1998 | Chacon, Sr. | 269/37 |
| 5,873,552 A | * | 2/1999 | Skarp | 248/161 |
| 6,059,159 A | * | 5/2000 | Fisher | 224/403 |
| 6,179,181 B1 | * | 1/2001 | Johnson et al. | 224/405 |
| 6,196,602 B1 | * | 3/2001 | Esplin | 296/3 |
| 7,114,896 B2 | * | 10/2006 | Lantrip | 410/7 |
| 7,641,086 B2 | * | 1/2010 | Green | 224/405 |
| 7,997,839 B1 | * | 8/2011 | Gallegos et al. | 410/106 |
| 2008/0076641 A1 | * | 3/2008 | Sheehan | 482/92 |

* cited by examiner

*Primary Examiner* — Terrell McKinnon
*Assistant Examiner* — Christopher Garft
(74) *Attorney, Agent, or Firm* — Grant's Law Firm; Allan Howard Grant

(57) ABSTRACT

A tie-down bar apparatus and method for securing Cargo onto the bed of trailer or full-size, mid-size, or small pick-up truck comprising an adjustable telescoping support bar having a main body and two ends, the main body of the telescoping support bar has at least one tie-down ring is connected to the main body for securing one or more pieces of cargo including recreational vehicles, the main body of the telescoping support bar has two elongated arm which are positioning inside each end of the main body, to create the telescoping effect so that the support bar can be adjusted to match the size of the width of a vehicle's bed. Wherein a user will install said pair of connectors to the vehicle thereby securely attaching said telescoping support bar to the bed of vehicle. Wherein a user will place one or more pieces of cargo into said bed of the vehicle and then utilize one or more restraining means for securing said cargo in an upright position by connecting said restraining means to both the tie-down rings and to the cargo.

4 Claims, 17 Drawing Sheets

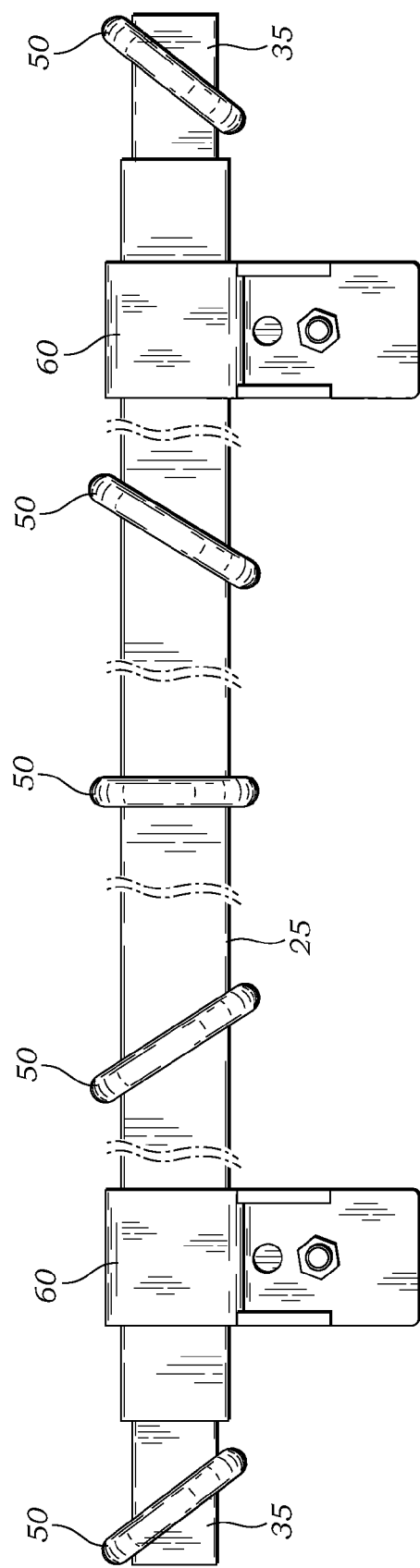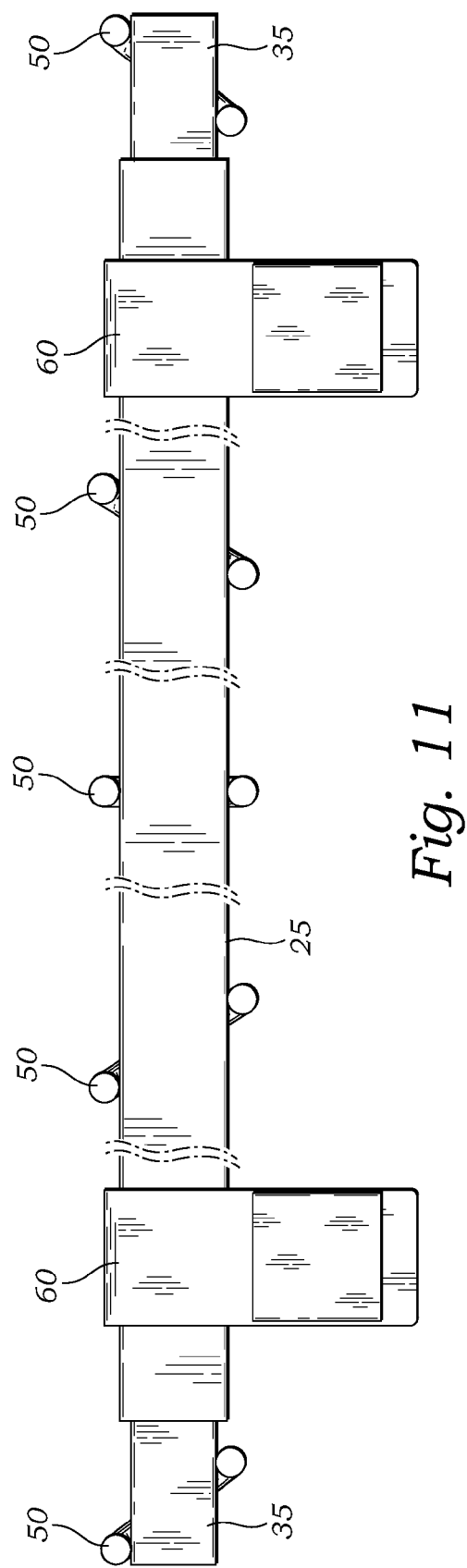

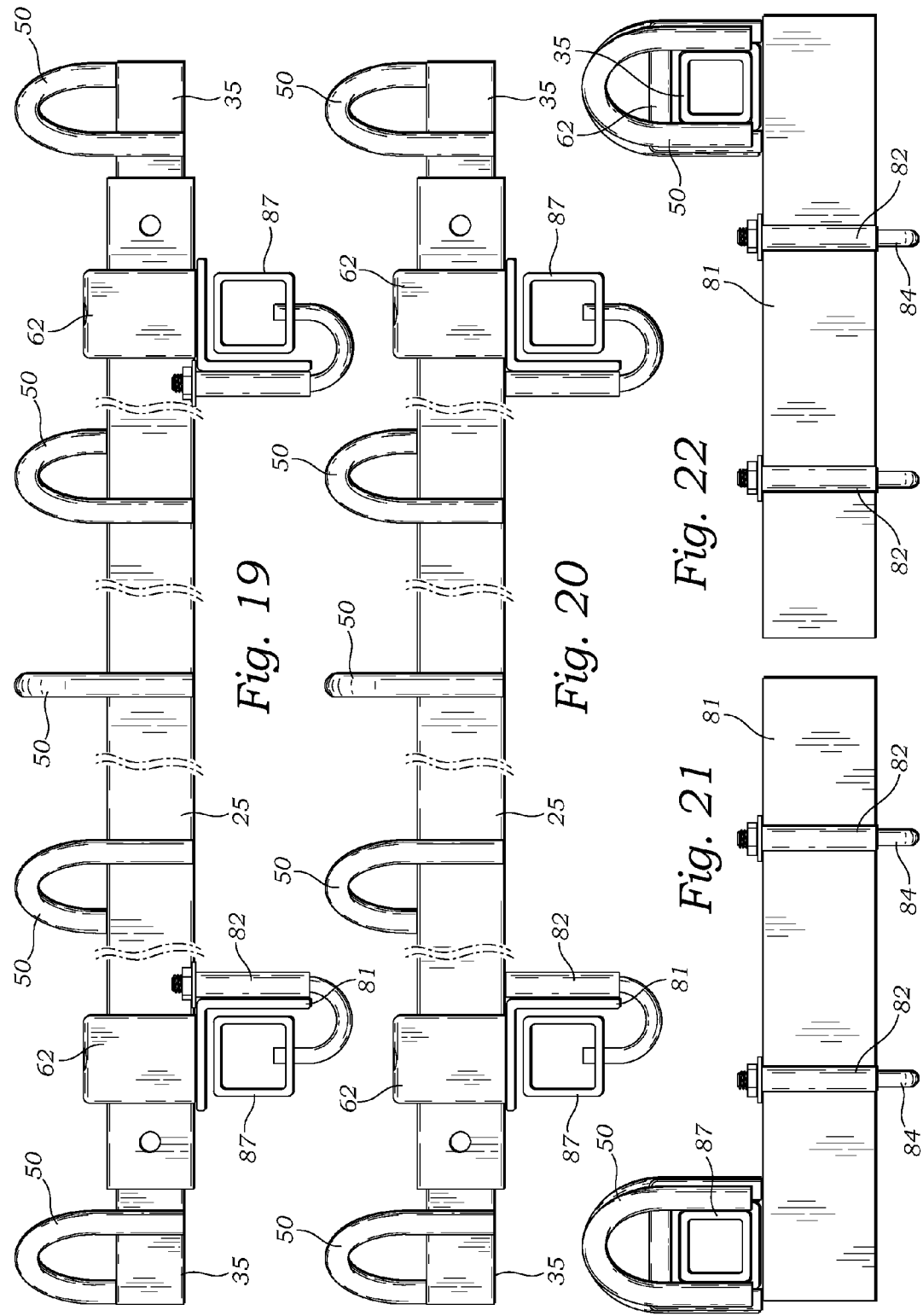

BIKE TIE DOWN BAR

CROSS-REFERENCE TO RELATED APPLICATIONS

Not Applicable

FIELD OF THE INVENTION

This invention relates to vehicle storage racks and more specifically to a device and method for securing Cargo such as Recreational Vehicles onto the bed of a transporting vehicle including but not limited to trailers or full-size, mid-size, or small pick-up trucks.

BACKGROUND OF THE INVENTION

Users of Recreational Vehicles such as all-terrain vehicles (hereinafter ATV), motorboats, kayaks, boats, windsurfers, snowmobiles, motorcycles, golf carts, go-carts, snow blowers, bicycles and the like, often face the significant challenge of how to transport these often heavy and unwieldy toys to a desired location.

An owner of a Recreational Vehicle is likely to keep the Recreational Vehicle in the garage. However, since the use of Recreational Vehicles is generally not appropriate in urban or suburban areas, the owner must transport The Recreational Vehicle to an open space area before use. Similar problems exist for the users of snow mobiles. While larger boats may be stored at a boat dock, smaller motorboats, kayaks, smaller sailboats, and windsurfers are often stored at home or elsewhere and need to be transported to the desired lake, river, reservoir, or ocean. While bicycles and motorcycles may be used in the city, it is often desirable to transport them to an open are for recreational use. In particular, mountain bike enthusiasts will often want to transport their bikes and themselves out to a trailhead in a truck or car before riding.

Since Recreational Vehicle's are often long and bulky, and therefore it is impossible to fit them into the trunk or cabin of a typical car. These types of vehicles will often not fit into the cargo area of a typical Sport Utility Vehicle. For these reasons, most users prefer to transport such vehicles in the cargo bed area of a flat bed pickup truck or a trailer. Such vehicles must be securely tied and held in place to prevent them from falling. Motorcycles for instance are very difficult to hold upright in a secure position while being transported due to their weight and design in having only two tires to position the bike upright. As such, there is a need in the art for a device and method to hold a motorcycle or Recreational Vehicle or the like, safely and secured from moving about the bed of a truck or trailer.

Although some prior art devices disclose Recreational Vehicle racks for use with a pickup truck, those devices are large, heavy rectangularity scaffolding system which make it difficult to load, remove and store. The Recreational Vehicle are positioned on the scaffolding above the cargo bed. It is very difficult for a person to single handedly load or release one of these systems. This can be a cumbersome task because these types of accessories are themselves generally heavy and unwieldy. As such, there is a need in the art for a quick and easy device and method that can hold a Recreational Vehicle or the like, safely and secured in the bed of a truck.

Additionally, there is a need in the art for a device and method that can effective transport two or more Recreational Vehicle's safely and securely on a single pickup truck cargo bed.

In fact, each and every automobile manufacture has different designs and dimensions for their pickup trucks. Some of those same automobile manufactures have different designs and dimensions for each model of their various pickup trucks. As a result, each of those trucks can have a different size truck bed. The truck bed width can vary from one side to the other side from 60" to 72" or equivalent. As such, there is a need in the art for a new device that can be adjusted by telescoping the size of the bar to match the size of the width of the truck bed, to ensure that the support bar and Recreational Vehicle are safely and securely attached to the pickup truck cargo bed or trailer.

SUMMARY OF THE INVENTION

It is an object of this invention that it may be used to tie down many different types of Recreational Vehicles or Cargo. Examples of suitable Recreational Vehicles to be tied down include, without limitation, ATV's, kayaks, motor boats, sail boats, bicycles, tricycles, motorcycles, windsurfers, lawnmowers, golf carts, go-carts, canoes, snow blowers, personal watercrafts, and snowmobiles.

It is an object of this invention to provide a telescoping tie down bar device for transporting Recreational Vehicles in the bed of a pickup truck for full-size, mid-size, and small pick-up trucks in an upright position, or in a trailer.

It is an object of this invention to provide a telescoping tie down bar device that is adjustable based on the width of the pickup truck bed, since the telescoping bar attached to the side bed rails of the truck.

It is an object of this invention to provide a truck bed or trailer tie-down apparatus with different mounting options. Wherein the tie-down apparatus uses tie-down rings and a unique telescoping bar with various stopping points to maximize tie-strap angles for one to three motorcycles. The telescoping bar allows this apparatus to be used with a full-size, mid-size, and small pick-up trucks, or trailers. What this product does is increase angle of straps to maximize hold-down stability and security for motorcycles, bicycles, and anything needing straps to secure it in the bed of a truck. The telescoping bar is new and not found on other tie-down products.

It is a further object of this invention that the telescoping portion can be set flush to bed side or extended from one to four different positions as needed. It is one pipe that fits inside another to form the telescoping process that adjusts for strap angle and for loading one or more Recreational Vehicles. The strap angle that has been developed eliminates bike sway, which is essential for hauling bikes safely or other cargo.

It is also an object of this invention that the telescoping apparatus is created by utilizing one or more pipes that fits inside a main pipe to form the telescoping, wherein the pipes are locked into place by a locking pin having a U shaped clamp that is pivotably secured to one side of the pin and has a receiving hole on the other side of the clamp for receiving the tip of the pin after the pin has been positioned through said pipes.

It is also an object of this invention that the telescoping apparatus use various mounting options to connect the apparatus to a user's trailer or full-size, mid-size, and small pick-up trucks through the use of a post pocket option, a bolt on option, a butterfly bolt in post pocket option, a U shaped clamp that is connected to a J bolt side mount option, a "u" shaped and "n" shaped mount that is connected to each other and connected to a J bolt side mount option or any other mounting which are known in the art.

It is an object of this invention that the telescoping tie down bar is equip with two or more tie-down rings for securing Recreational Vehicles through means that are well know in the art for example ropes, chains, straps, or cords. The Recreational Vehicles may also be locked or clamped by means that are well known.

It is an object of this invention in one embodiment that the telescoping tie down bar device can be secured to one or more Recreational Vehicles through the use of the various mounting options. Preferably, one or more tie-down clamps are used to further facilitate the securing of one or more motorcycle in an upright position.

It is a further object of this invention to provide a telescoping tie down bar device which is adapted to use tie down rings to secure the transported vehicle to various points on the device.

It is still further an object of this invention to provide a telescoping tie down bar device which is quick and easy to install and removed from the bed of the vehicle or trailer.

A further object of the invention is to protect the back glass of the cab from being damaged by any cargo or Recreational Vehicle by allowing it to be properly strapped down.

A further object of the invention is, as most new pickup trucks have lockable tailgates, to allow the tailgate to be locked, thus making the loaded vehicle more difficult to steal.

These and other objects of the invention are preferably accomplished by providing a telescoping tie down bar device for transporting cargo or Recreational Vehicle and other vehicles in an upright position in the bed of a pickup truck.

Another aspect of the invention, there is disclosed a method of using the described device for securing one or more vehicles onto the cargo bed of a transporting vehicle or trailer.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

These as well as other features of the present invention will become more apparent upon reference to the accompanying drawings wherein like numerals designate corresponding parts in the several figures.

FIG. 10 is an underside view of the telescoping tie down bar device.

FIG. 11 is an overhead view of the telescoping tie down bar device.

FIG. 19 is a back view of the telescoping tie down bar device.

FIG. 20 is a front view of the telescoping tie down bar device.

FIG. 21 is a side view of the telescoping tie down bar device.

FIG. 22 is the opposite side view of the telescoping tie down bar device.

Figure 1:
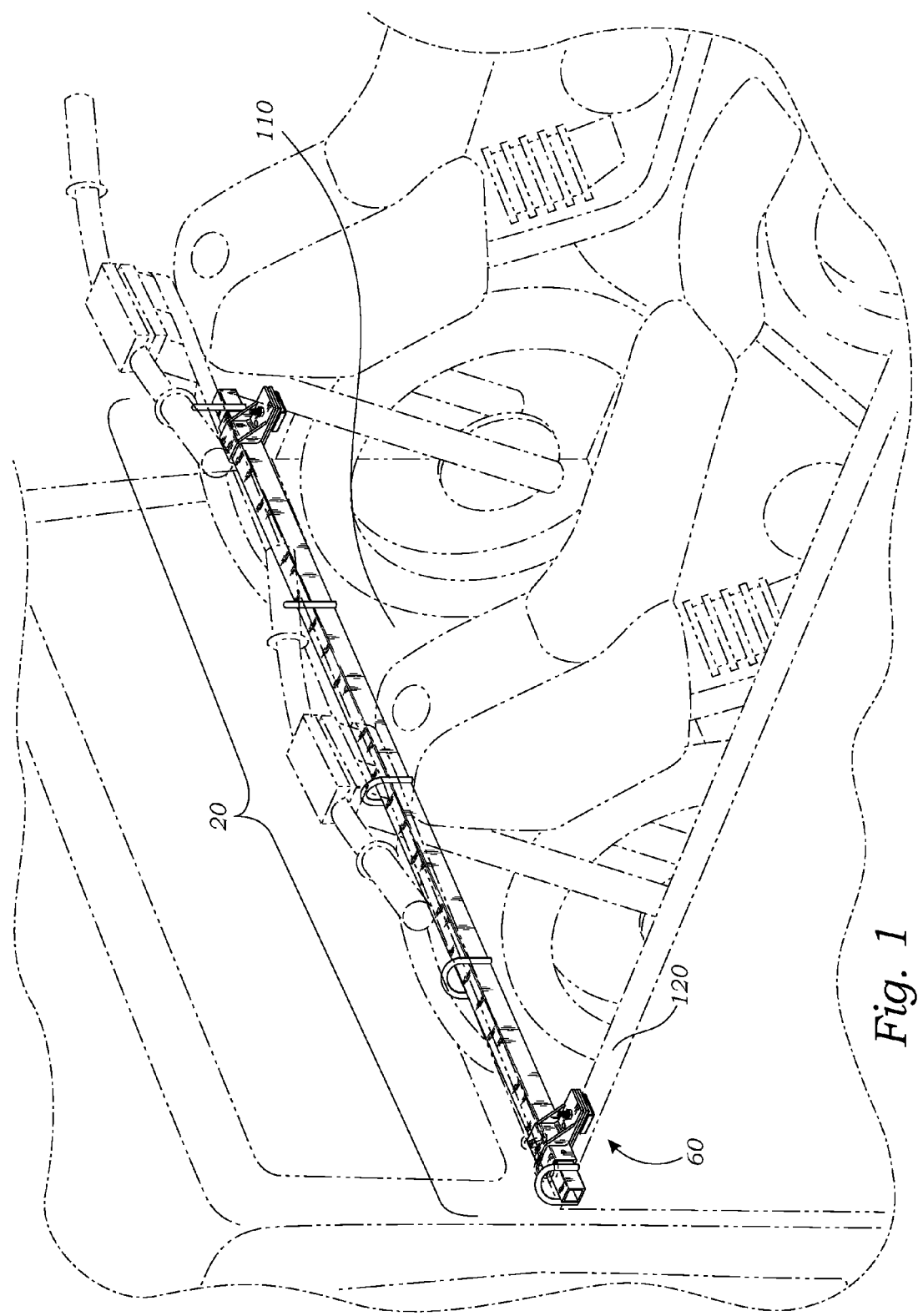
FIG. 1 is a perspective view of a telescoping tie down bar device attached to the back of a pickup truck using a post pocket mount option, wherein two Recreational Vehicles positioned in the back of the truck bed.
Figure 2:
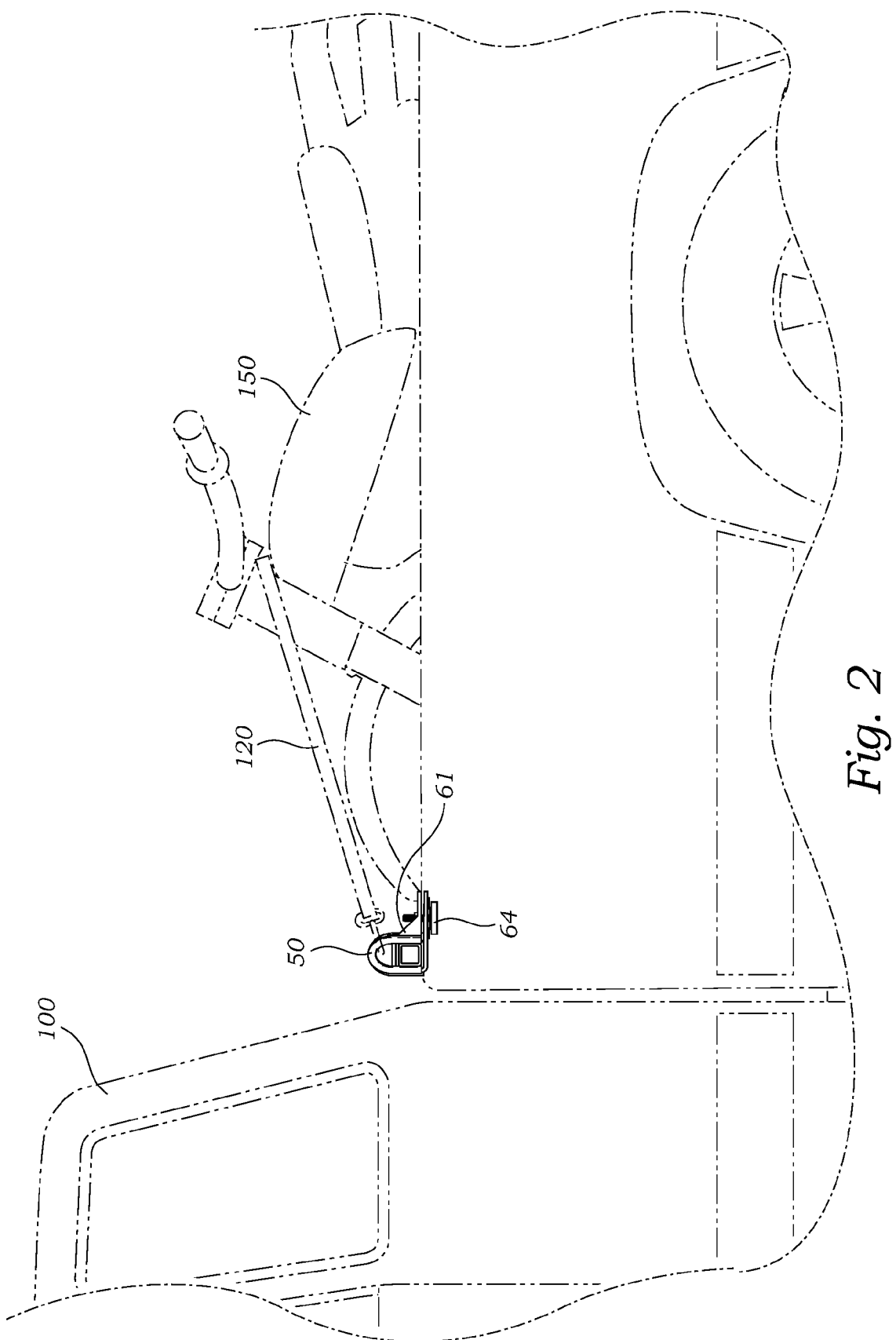
FIG. 2 is a side view of a telescoping tie down bar device connected to a pickup truck through the use of a post pocket mount option, showing bungee cords attaching to the Recreational Vehicle and the telescoping tie down bar device so that the Recreational Vehicle is secured in an upright position.
Figure 3:
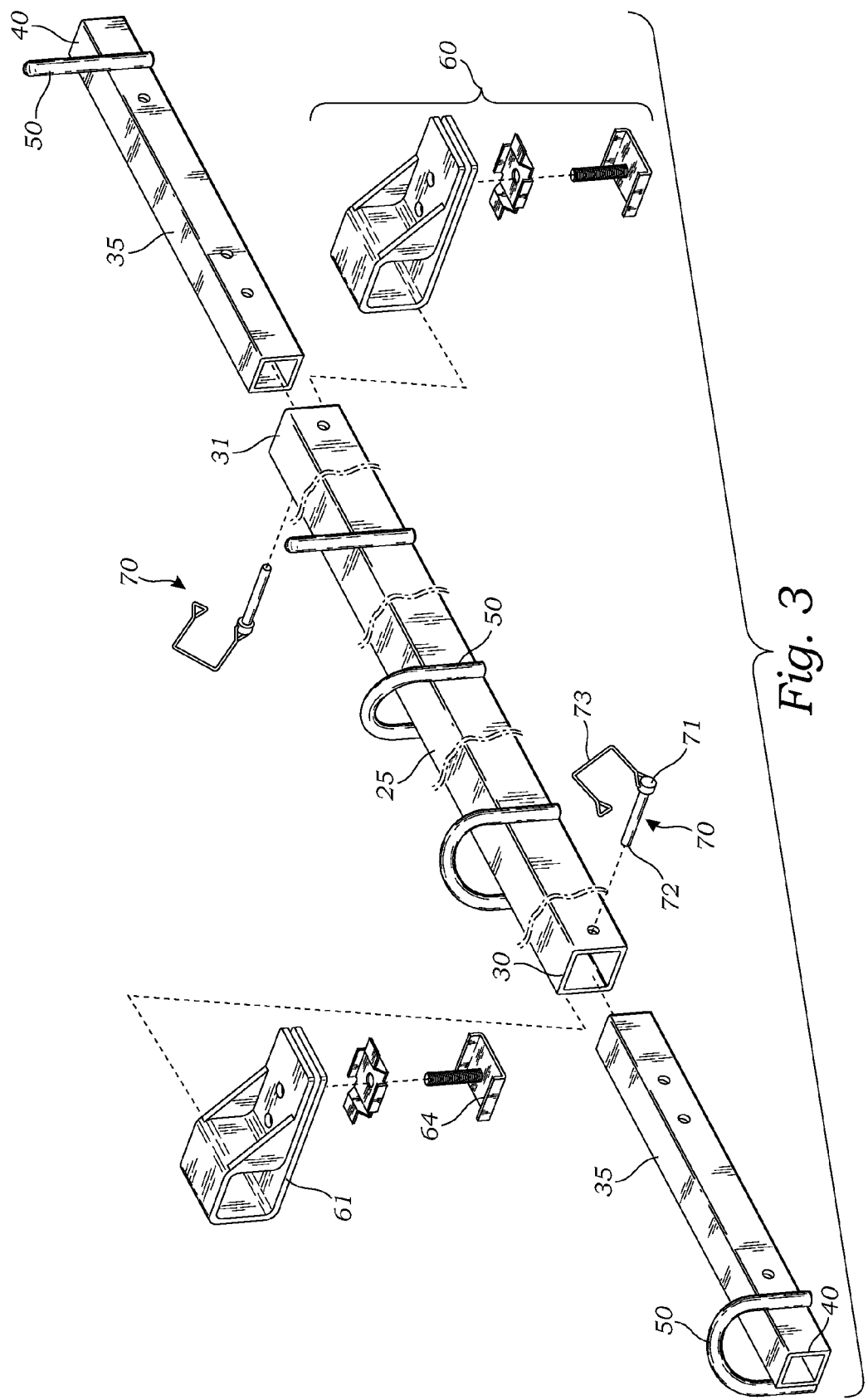
FIG. 3 is an exploded perspective view of the telescoping tie down bar device, showing the "d" shaped clamp that is connected to a butterfly bolt, which is positioned in the rails of a vehicle to provide a post pocket mounting option.
Figure 4:
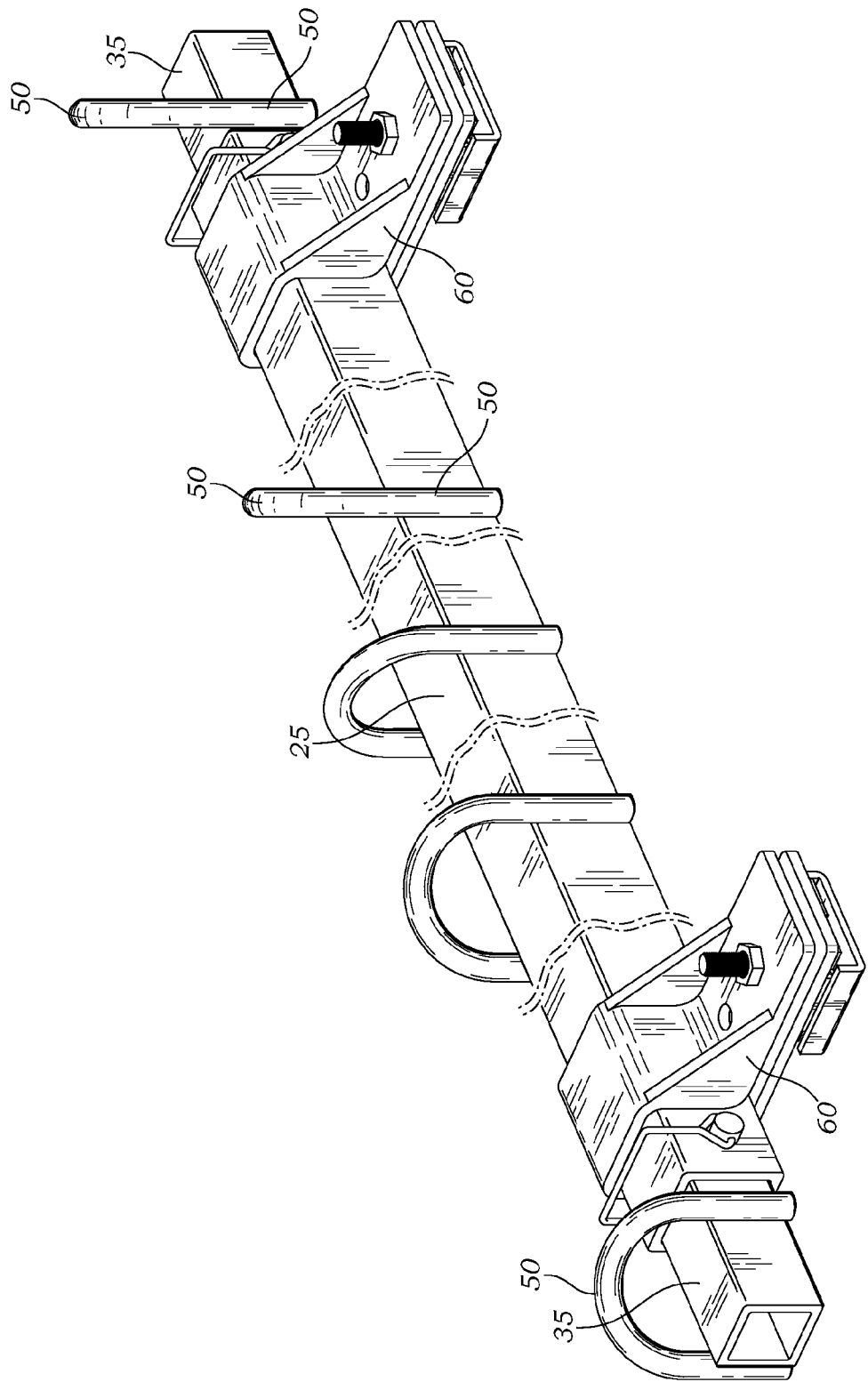
FIG. 4 is a perspective view of the telescoping tie down bar device showing the telescoping bars on each side positioned inside connector bar.
Figure 5:
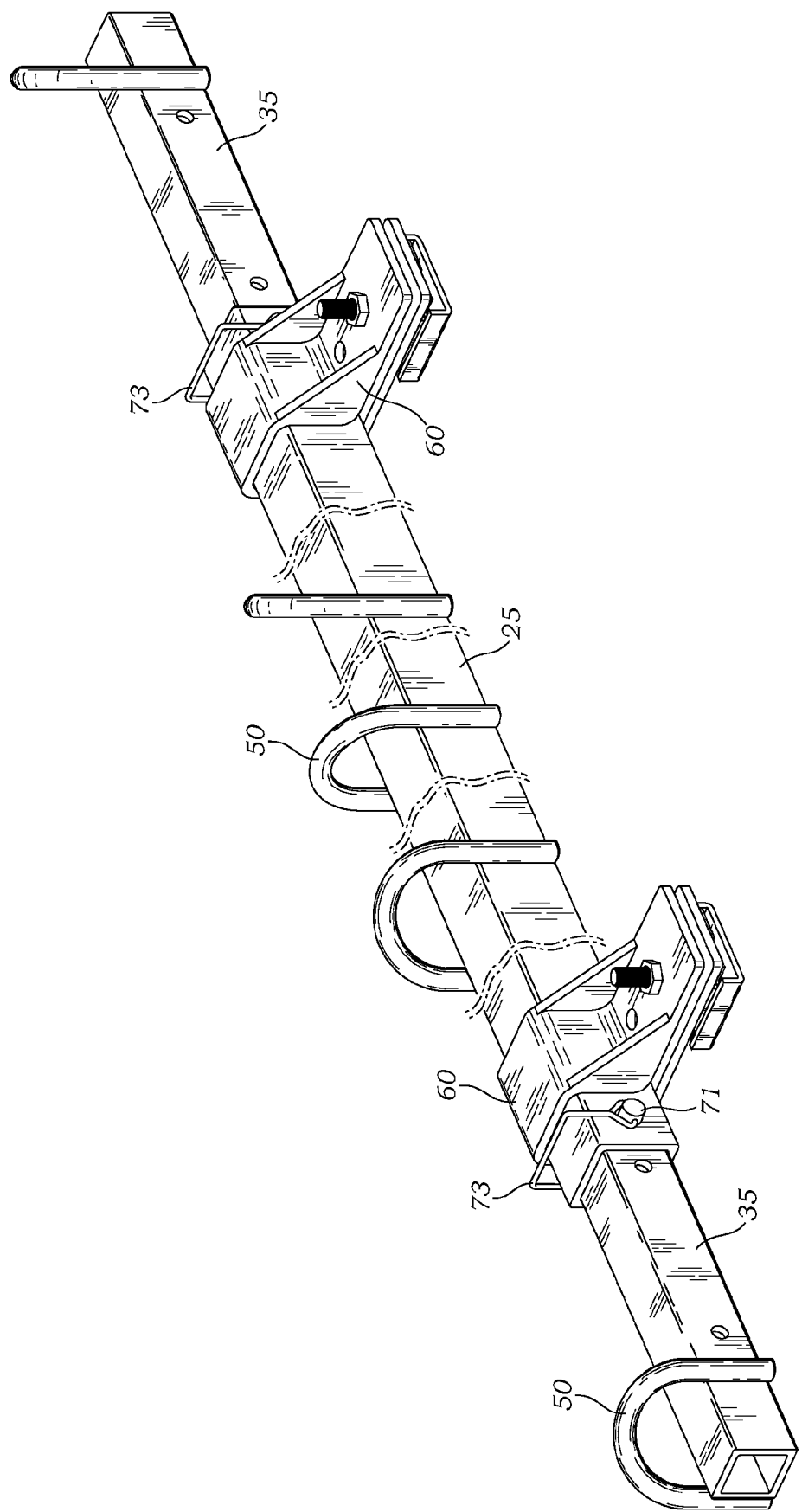
FIG. 5 is a perspective view of the telescoping tie down bar device showing the telescoping bars on each side expanding from the connector bar to enable it to adjust to different pickup truck bed widths.
Figure 6:
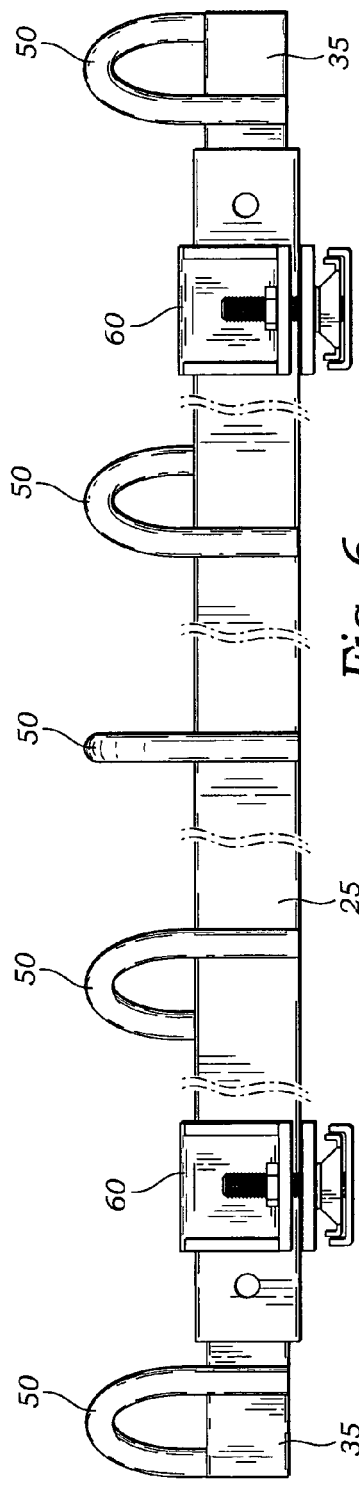
FIG. 6 is a back view of the telescoping tie down bar device.
Figure 7:
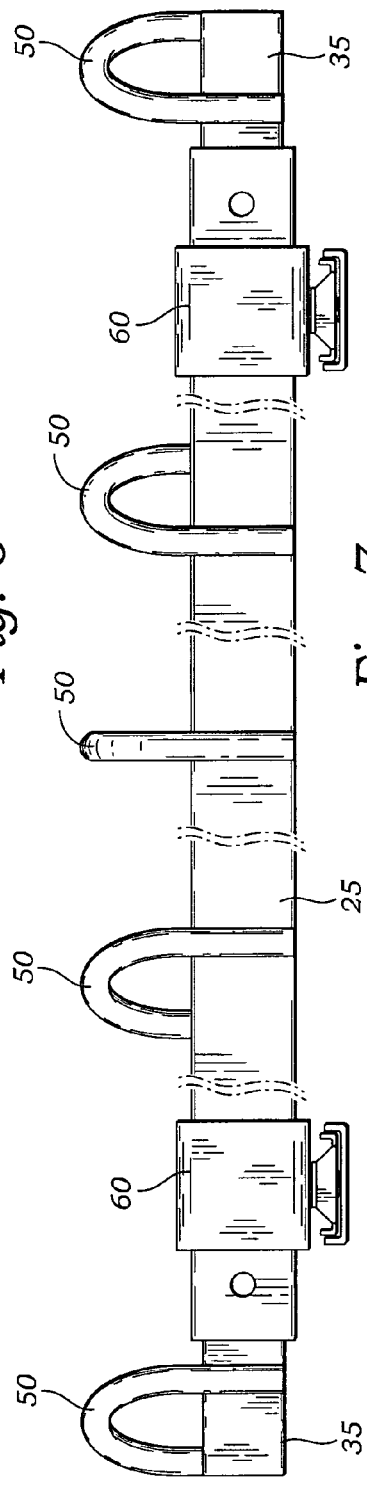
FIG. 7 is a front view of the telescoping tie down bar device.
Figure 9:
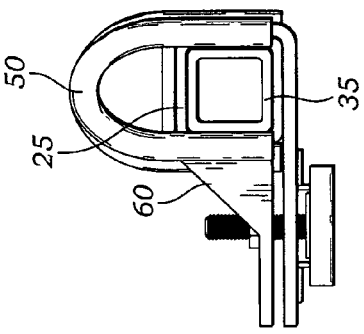
FIG. 9 is the opposite side view of the telescoping tie down bar device.
Figure 8:
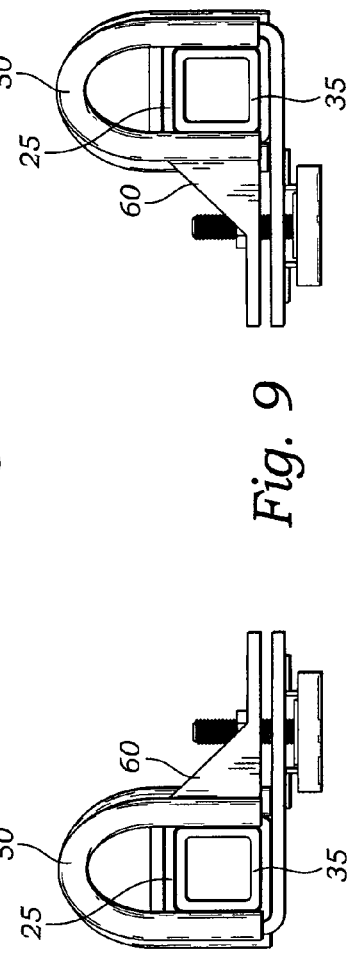
FIG. 8 is a side view of the telescoping tie down bar device.
Figure 12:
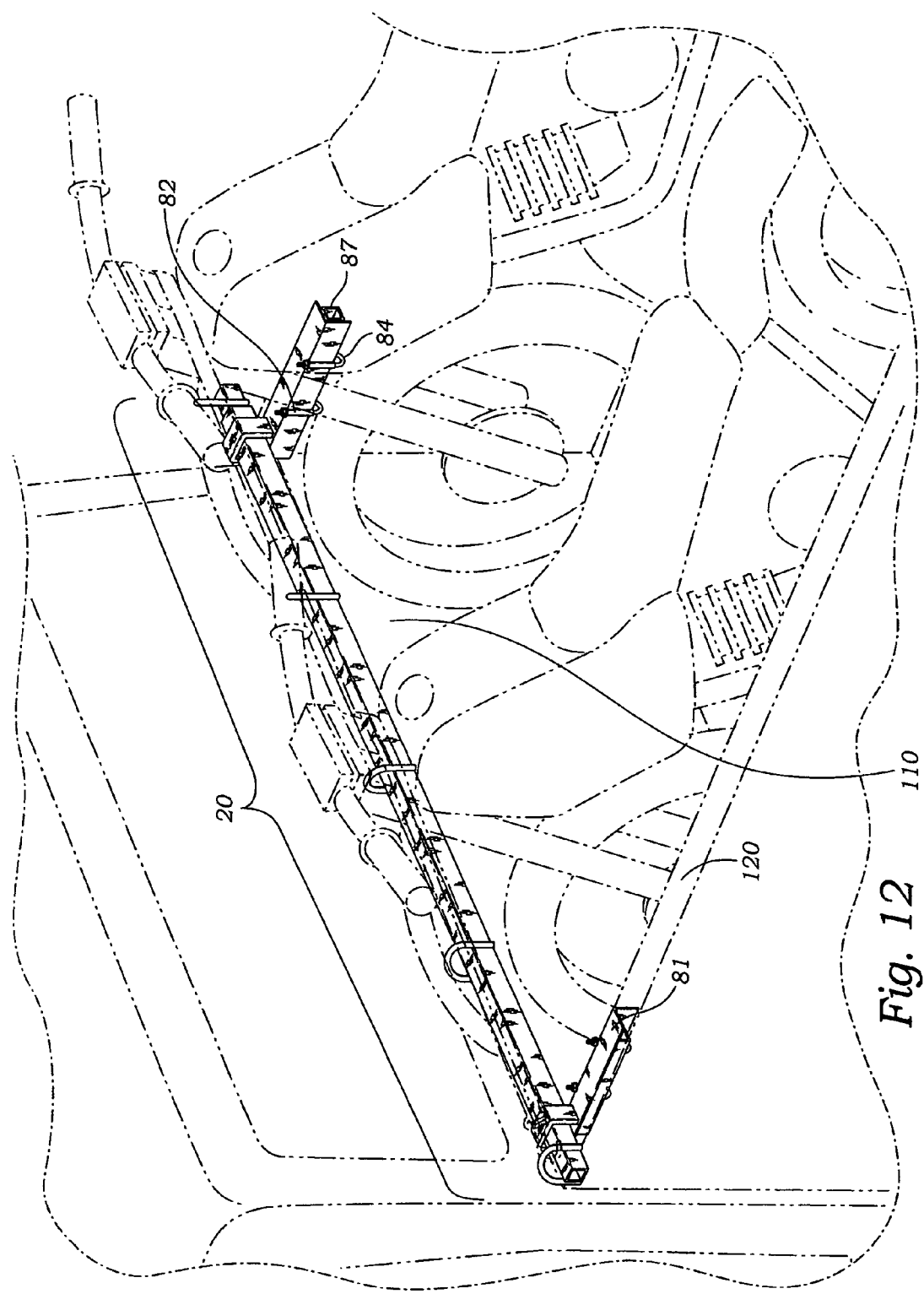
FIG. 12 is a perspective view of a telescoping tie down bar device attached to the back of a pickup truck using a J bolt mounting option to secure the telescoping bar to truck, wherein two Recreational Vehicles positioned in the back of the truck bed.
Figure 13:
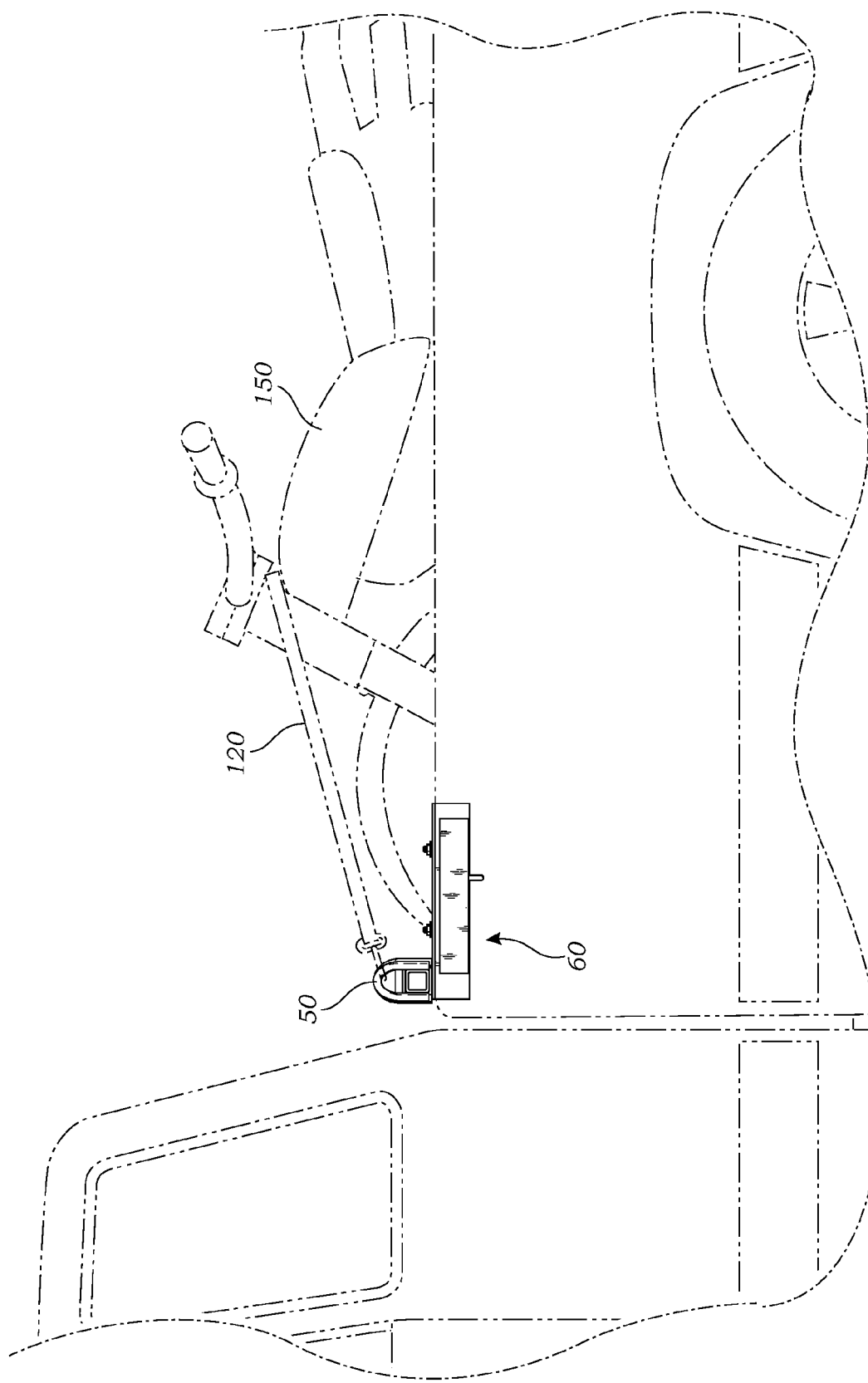
FIG. 13 is a side view of a telescoping tie down bar device connected to a pickup truck through the use of a J bolt mounting option, showing bungee cords attaching to the Recreational Vehicle and the telescoping tie down bar device so that the Recreational Vehicle is secured in an upright position.

Other features and advantages of the invention will become apparent from the following detailed description, taken in conjunction with the accompanying drawings, which illustrate, by way of example, various features of embodiments of the invention.

DETAILED DESCRIPTION OF THE PREFERRED EMBODIMENTS

The following detailed description and accompanying drawings are provided for purposes of illustrating and describing presently preferred embodiments of the invention and are not intended to limit the scope of the invention in any way. It will be recognized that further embodiments of the invention may be used.

While the description above refers to particular embodiments of the present invention, it will be understood that many modifications may be made without departing from the spirit thereof. The presently disclosed embodiments are therefore to be considered in all respects as illustrative and not restrictive.

The tie-down apparatus of the present invention can be quickly and easily secured on to truck beds of various sizes. The telescoping support bar can be used to provide stability for various cargo or Recreational Vehicles such as ATV's, kayaks, bicycles, tricycles, motorcycles, windsurfers, lawnmowers, golf carts, go-carts, canoes, snow blowers, personal watercrafts, and snowmobiles during transportation.

Referring to the drawings more particularly by reference numbers, FIGS. 1 through 24 show an adjustable telescoping support bar 20. The present invention provides an apparatus and method for altering the length of the telescoping support bar 20.

The tie-down apparatus of the present invention in the preferred embodiment is comprised of: an adjustable telescoping support bar 20 having a main body 25 and two ends 30 and 31; the main body 25 of said telescoping support bar 20 has at least one tie-down ring 50 which is connected to the main body 25 for securing cargo such as one or more recreational vehicles; the main body 25 of the telescoping bar 20 has two elongated arm 35 which are positioning inside each end 30 & 31 of said main body 25, to create the telescoping effect so that the support bar 20 can be adjusted to match the size of the width the bed 110 of a truck 100; the elongated arms 35 have one tie-down ring 50 that is connected to each end 40 of said elongated arms 35, which results in at least a portion of each of said elongated arms 35 being exposed on each side of said main body 30 & 31 for securing a recreational vehicle 150 to said tie-down rings 50; a pair of connectors 60 are used for securely attaching said main body 25 with said arms 35 & 36 to each side of the truck bed 110; and wherein said telescoping support bar 20 having said main body 25 with said arms 35 has been properly adjusted to match the size of the width of said truck bed 110, a locking pin 70 is used to lock said main body 25 into place with said arms 35 on each side.

The locking pin 70 in the preferred embodiment has a U shaped clamp 73 that is pivotably secured to the back 71 of the pin on one side and has a receiving hole 74 on the other side of the U shaped clamp 73 for receiving the tip 72 of the pin after the pin has been positioned through the main body 25 and the arms 35 & 36, so as to lock the telescoping bar in place. In short, a user will flip the U shaped clamp connected to locking pin over said telescoping support bar to lock said support bar in place by inserting said tip of said pin into said receiving hole at the other end of said U shaped clamp.

FIGS. 1-11 show a pair of connectors 60 has means for securely attaching said telescoping support bar 20 into the holes 125 in the side rails 120 of said truck bed 110. In one embodiment, the pair of connectors 60 are "d" shaped clamps 61 that are connected to a butterfly bolt 64, which are positioned in the side rails 120 of a vehicle to provide a post pocket mounting option that utilizes the existing holes in the side rails of a truck bed.

Alternatively, FIGS. 12-24 show a pair of connectors 60 has means for securely attaching said telescoping support bar 20 to the side rails 120 of said truck bed 110 without the use of existing holes in the side rails of a truck.

Figure 14:
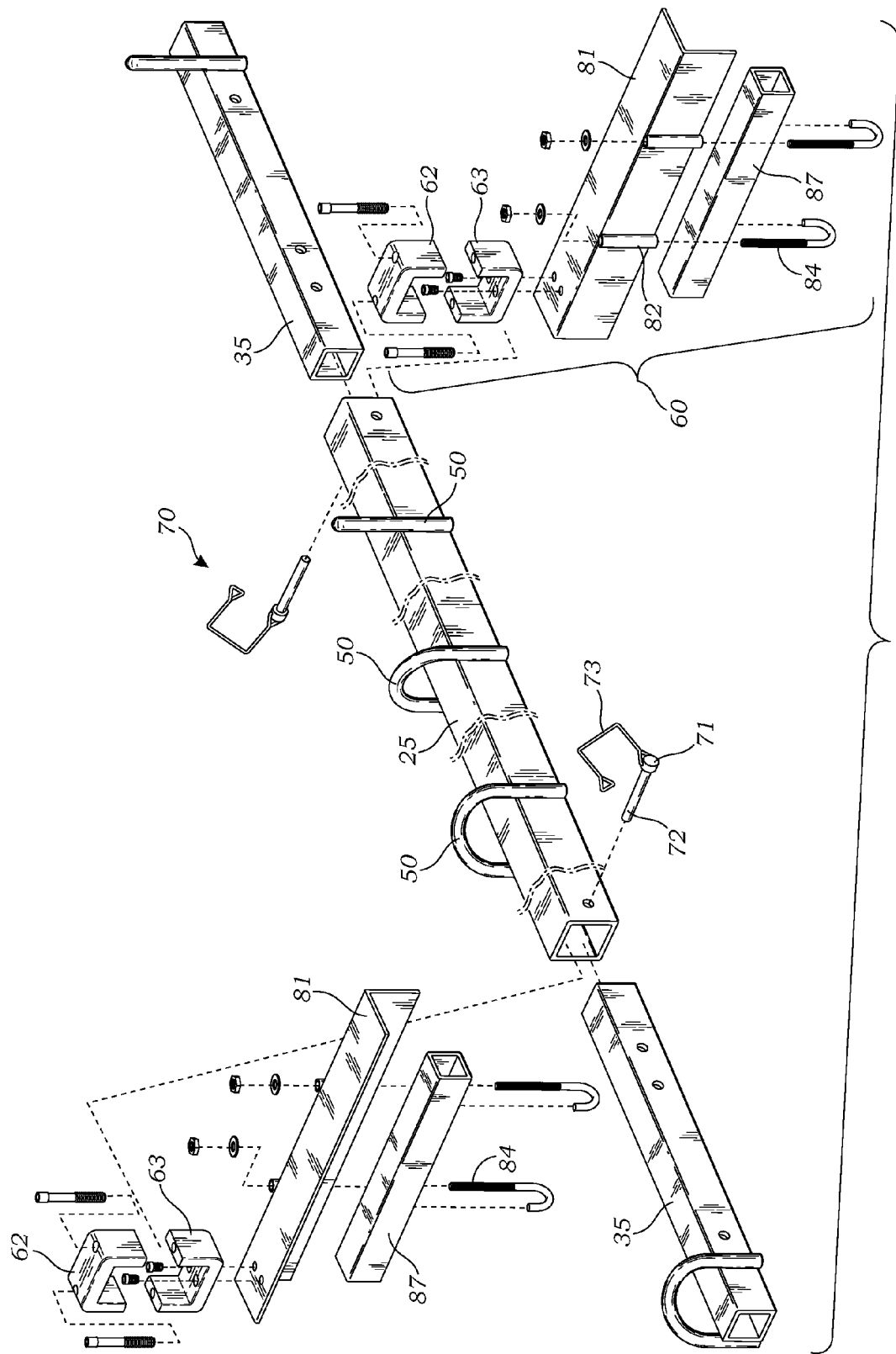
FIG. 14 is a is an exploded perspective view of the telescoping tie down bar device showing the "u" shaped and "n" shaped clamp that are connected to J bolt mounting option.
Figure 15:
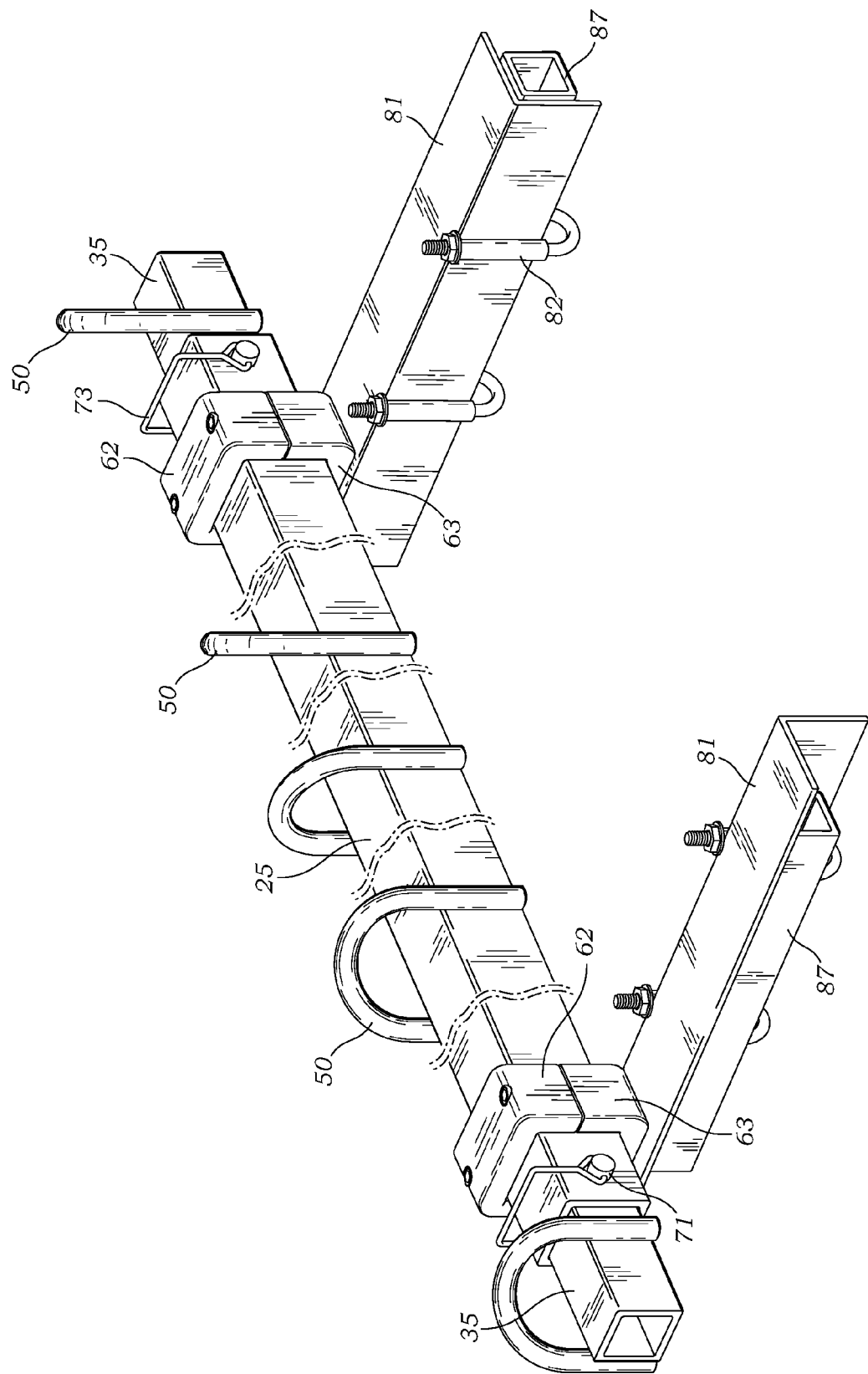
FIG. 15 is a perspective view of the telescoping tie down bar device showing the telescoping bars on each side positioned inside connector bar, wherein the telescoping bar is positioned though the "u" shaped clamp and "n" shaped clamp that are connected to each other and then connected to J bolt mounting option.
Figure 16:
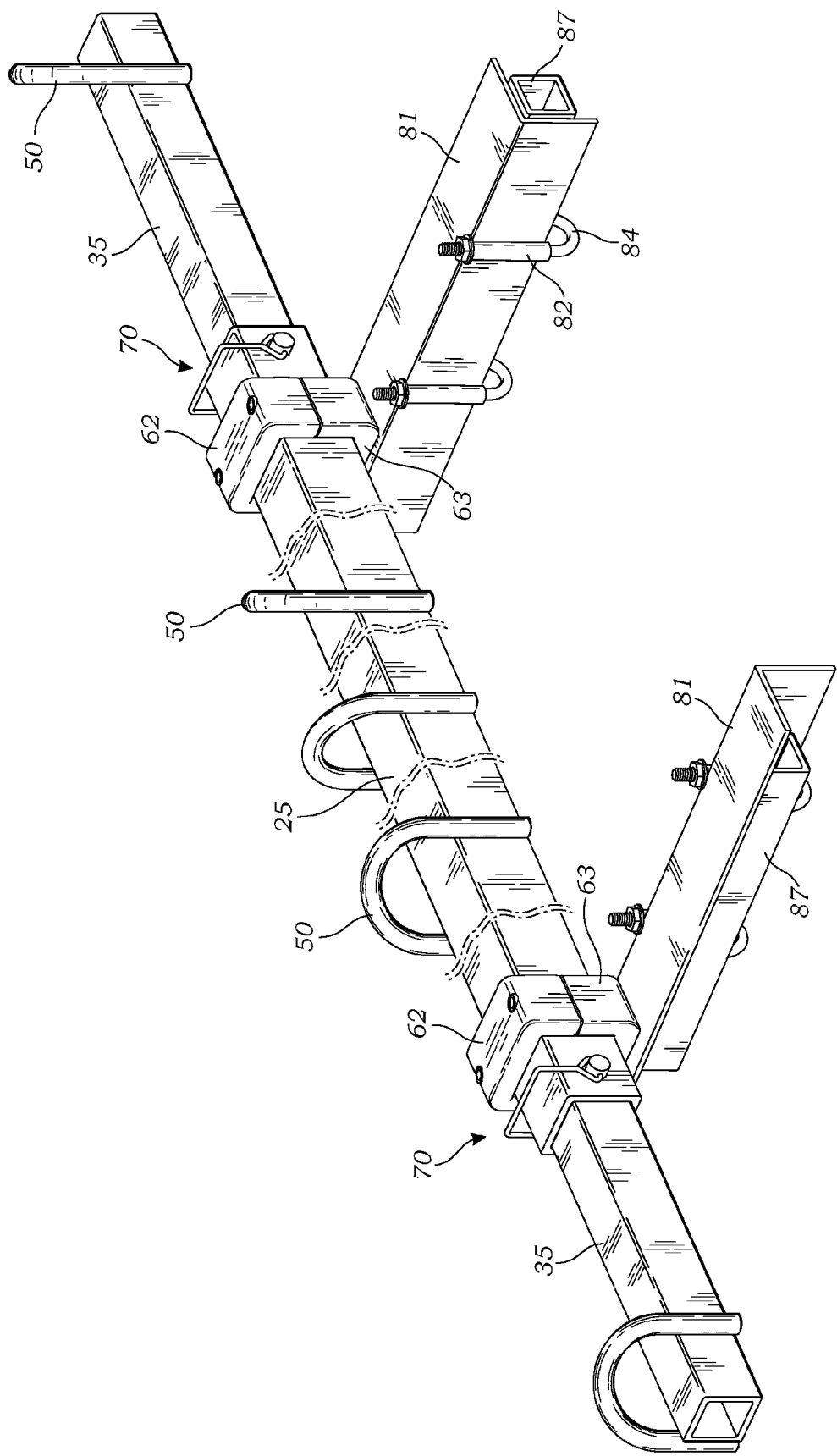
FIG. 16 is a is an exploded perspective view of the telescoping tie down bar device showing the "u" shaped clamp that are connected to J bolt mounting option.

In the preferred embodiment, shown in FIGS. 14-16, the pair of connectors 60 are "u" shaped 62 and "n" shaped 63 clamps that are connected to J bolt mounting option 80 secures the telescoping support bar 20 to the side rails 120 of said truck bed 110 without the use of existing holes in the side rails of a truck.

Figure 17:
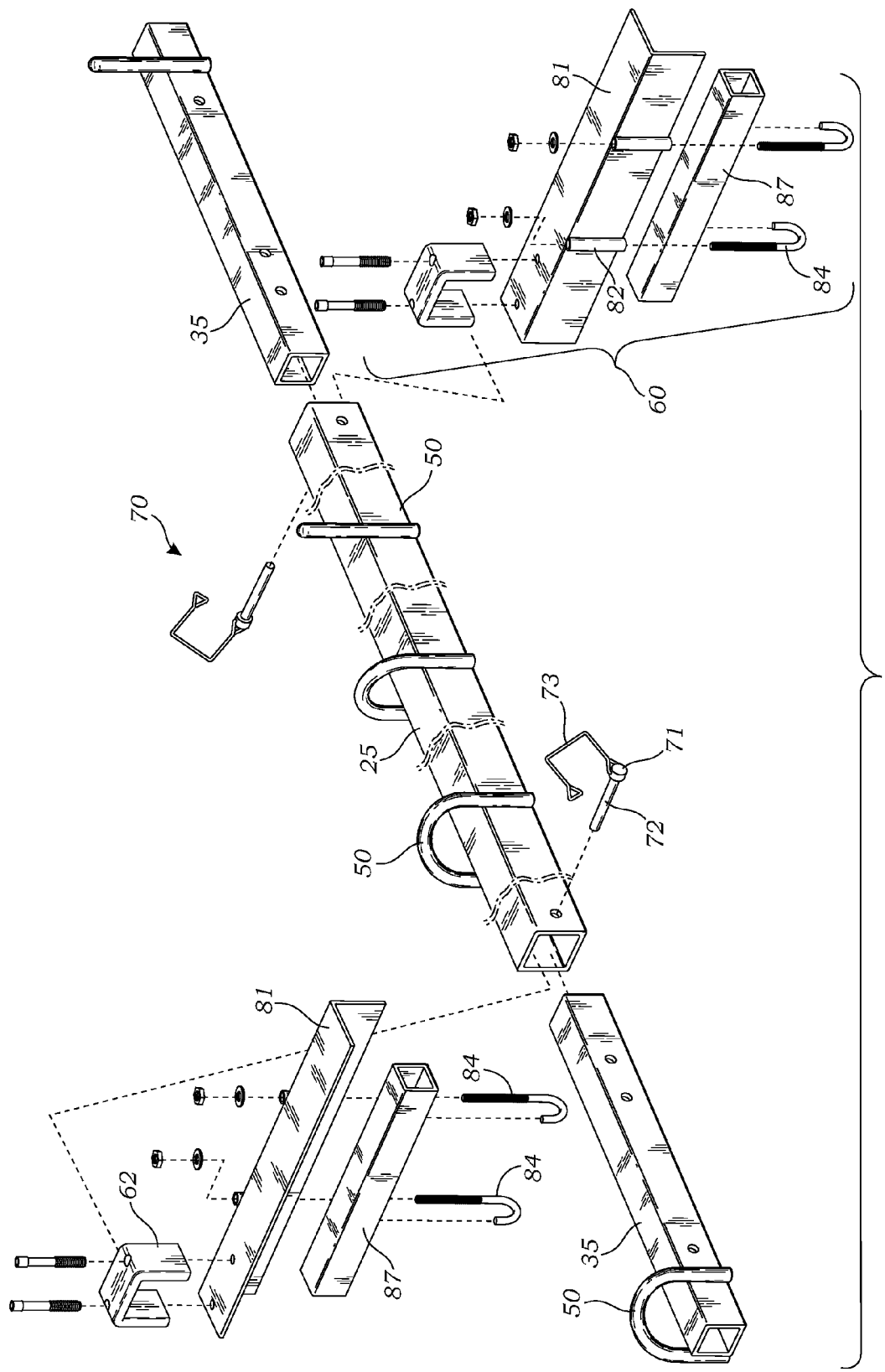
FIG. 17 is a perspective view of the telescoping tie down bar device showing the telescoping bars on each side positioned inside connector bar, wherein the telescoping bar is positioned though the "u" shaped clamp that are connected to J bolt mounting option.
Figure 18:
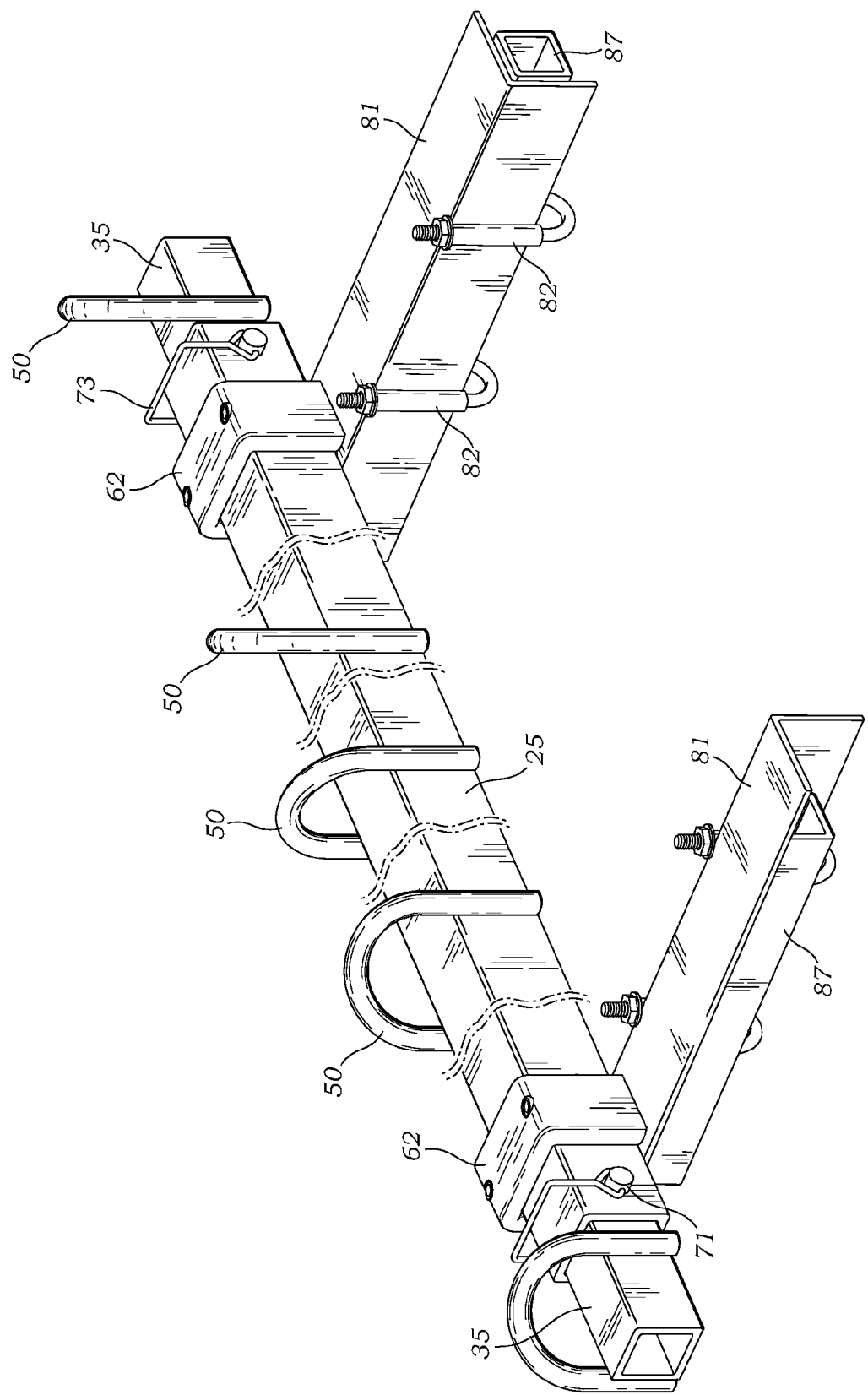
FIG. 18 is a perspective view of the telescoping tie down bar device showing the telescoping bars on each side expanding from the connector bar to enable it to adjust to different pickup truck bed widths.
Figure 23:
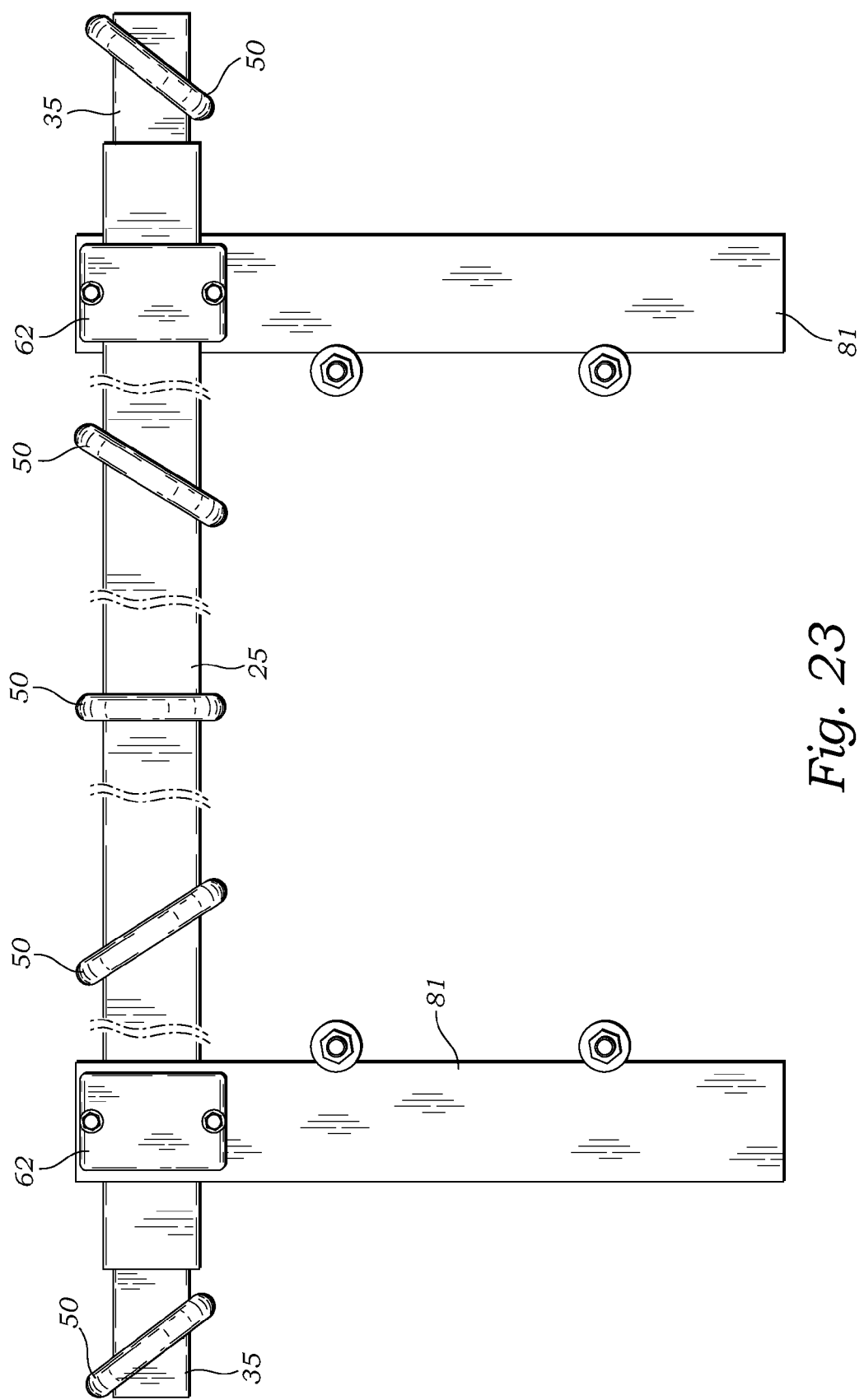
FIG. 23 is an underside view of the telescoping tie down bar device.
Figure 24:
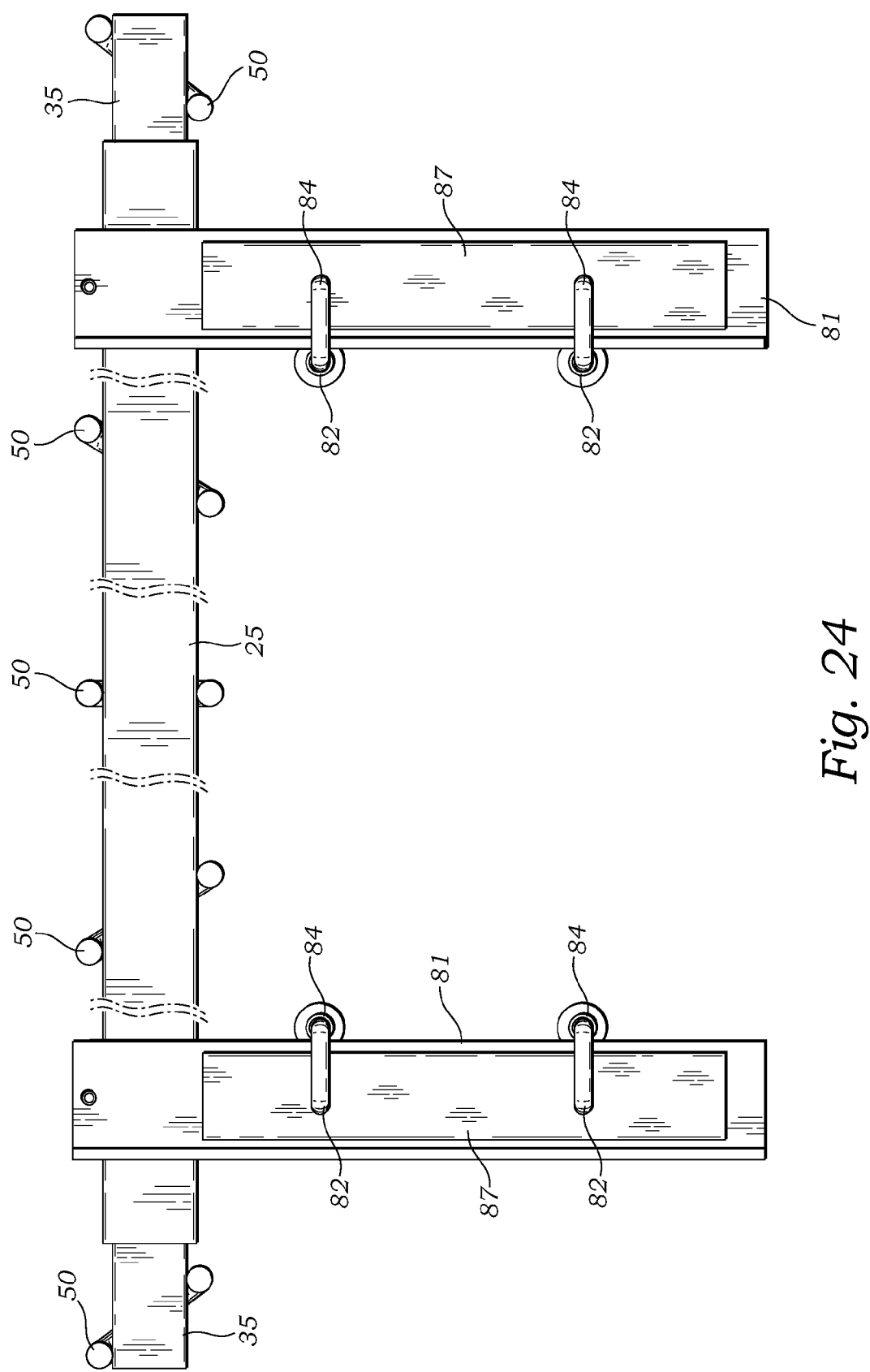
FIG. 24 is an overhead view of the telescoping tie down bar device.

In yet another alternative embodiment, FIGS. 17 and 18 show the pair of connectors 60 are "u" shaped clamps that are connected to J bolt mounting option 80 secures the telescoping support bar 20 to the side rails 120 of said truck bed 110 without the use of existing holes in the side rails of a truck.

As shown in FIGS. 12-24, the J bolt mounting option 80 that secures the telescoping support bar 20 to the side rails 120 of said truck bed 110 without the use of existing holes in the side rails of a truck is comprised of an L shaped piece of angle iron 81 which has at least two bolt holders 82 welded to the angle iron 81 and a J bolt 84 is connected on one end to a securing pillar 87 and inserted into the bolt holder 82 on the other end and then secured into place with fasteners 88; wherein the L shaped angle iron 81 is positioned on top of the side rail 120 of a truck and the J bolt 84 with the securing pillar 87 is positioned underneath the side rail to provide a secure connection.

Various connectors 60 can be used to secure the telescoping apparatus to the bed of trailer or a full-size, mid-size, small pick-up trucks through the use of either a post pocket option, a bolt on option, a butterfly bolt in post pocket option, a J bolt side mount option, or other connectors know in the art.

The connectors 60 are adjustable relative to one another, such that the distance can be varied to permit mounting on to the truck beds of various sizes.

Various restraining means 120 can be used for restraining one or more of said Recreational Vehicle 150 in an upright position by connecting said restraining means to both said tie-down ring 50 and to said Recreational Vehicle 150. Wherein said restraining means 120 can be selected from a group consisting of rope, straps, cords, and chains.

As illustrated in FIGS. 1, 2, 12, and 13 a pickup truck bed includes sidewalls with an upper edge having one or more openings therein.

The telescoping support bar is constructed of an outer main tube having two slightly smaller inner tube positioned within outer main tube. The telescoping support bar and its tubes may be constructed of steel, aluminum or other suitable material. The pin passes through the holes in the main outer tube, and through holes in the inner tube to lock the telescoping bar in the desired length which is approximately equal to the width of the truck bed. A connector ring is positioned around each side of either main tube or inner tube and clip the retain pin in place once the telescoping support bar is properly adjusted for mounting to a truck bed.

Preferably, the outer tube has a length that is just a bit shorter than the width of the smallest truck bed to which telescoping support bar are mounted to. However, if necessary, one or more arms could be secured inside the larger diameter outer main tube. Tubes are made of material and wall thickness which is sufficiently strong that they can carry the load imposed on them when supporting a recreational vehicle such as a bicycle, motorbike, motorcycle or cargo.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

What is claimed is:

1. A tie-down apparatus for securing recreational vehicles onto a cargo bed of a full-size, mid-size, or small pick-up truck comprising:

an adjustable telescoping support bar having a main body and two ends;

said main body of said telescoping bar having at least one tie-down ring connected to the main body for securing one or more recreational vehicles;

said main body of said telescoping bar having two elongated arms positioned inside each end of said main body to create the telescoping effect, so that the support bar is adjustable to match the width of the cargo bed;

said elongated arms having one tie-down ring connected to an end of said elongated arms, which results in at least a portion of each of said elongated arms being exposed on each side of said main body for securing a recreational vehicle to said tie-down rings;

a pair of connectors for securely attaching said main body with said arms to said truck bed;

a locking pin locking said arms to said main body in an adjusted position matching the size of the width of said truck bed;

said locking pin having a U shaped clamp pivotably secured to a back of said pin on one side and a receiving hole on another side of said U shaped clamp for receiving a tip of said locking pin after said locking pin is positioned through the main body and the arms, so as to lock the telescoping bar in place; and said pair of connectors are "u" shaped clamps that connect to a J bolt mounting which secures the telescoping support bar to side rails of said cargo bed without use of existing holes in side rails of said cargo bed; said J bolt mounting is comprised of an L shaped piece of angle iron which has at least two bolt holders welded to the angle iron and a J bolt that is connected on one end to a securing pillar and inserted into the bold holder on another end and then secured into place with fasteners.

2. A tie-down bar for securing cargo onto a cargo bed of a vehicle comprising:

an adjustable telescoping support bar having a main body and two ends;

said main body of said telescoping bar having at least two or more tie-down rings connected to the main body for securing said cargo;

said main body of said telescoping bar having at least one arm for positioning inside each end of said main body, to create the telescoping effect so that the support bar is adjustable to match the width of the cargo bed;

locking pins having U shaped clamps pivotably secured to a back of said pins on one side and receiving holes on another side of said U shaped clamps for receiving a tip of said locking pins after said locking pins have been positioned through the main body and the arms, so as to lock the telescoping bar in place:

one of said locking pins are used on each end of said main body to lock said arms into place with said main body;

each of said arms have a tie-down ring connected to an end of said arms which results in at least a portion of each of said arms being exposed on each side of said main body;

a pair of connectors used for attaching said main body with said arms to said cargo bed; and said pair of connectors are "u" shaped clamps connected to a J bolt mounting which secures the telescoping support bar to side rails of said cargo bed without use of existing holes in the side rails; said J bolt mounting is comprised of an L shaped piece of angle iron having at least two bolt holders welded to the angle iron and a J bolt connected on one end to a securing pillar and inserted into the bolt holder on another end and secured into place with fasteners.

3. A tie-down apparatus for securing recreational vehicles onto a cargo bed of a full-size, mid-size, or small pick-up truck comprising:

an adjustable telescoping support bar having a main body and two ends;

said main body of said telescoping bar has at least one tie-down ring connected to the main body for securing one or more recreational vehicles;

said main body of said telescoping bar has two elongated arms positioned inside each end of said main body, to create the telescoping effect so that the support bar is adjustable to match the width of the cargo bed;

each of said elongated arms have one tie-down ring connected to an end of said elongated arms, which results in at least a portion of each of said elongated arms being exposed on each side of said main body for securing a recreational vehicle to said tie-down rings;

a pair of connectors used for securely attaching said main body with said arms to said cargo bed, said pair of connectors are "u" shaped clamps that are connected to a J bolt mounting which secures the telescoping support bar to side rails of said cargo bed without use of existing holes in the side rails; said J bolt mounting is comprised of an L shaped piece of angle iron which has at least two bolt holders welded to the angle iron and a J bolt that is connected on one end to a securing pillar and inserted into the bolt holder on another end and then secured into place with fasteners; and a locking pin locking said arms to said main body in an adjusted position matching the size of the width of said truck bed.

4. A tie-down apparatus of claim 3, further comprising said locking pin having a U shaped clamp pivotably secured to a back of said pin on one side and a receiving hole on another side of said U shaped clamp for receiving a tip of said locking pin after said locking pin is positioned through the main body and the arms, so as to lock the telescoping bar in place.

* * * * *